Dec. 27, 1927.  1,653,660
R. G. RICHARDSON
SPEED GOVERNOR
Filed Nov. 3, 1922
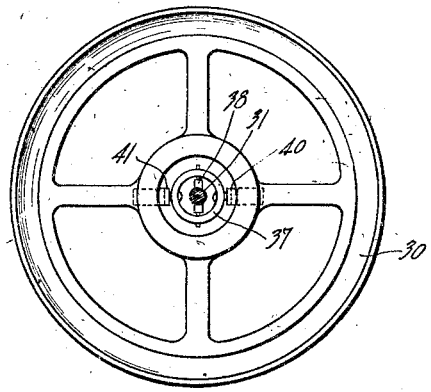
Fig:3
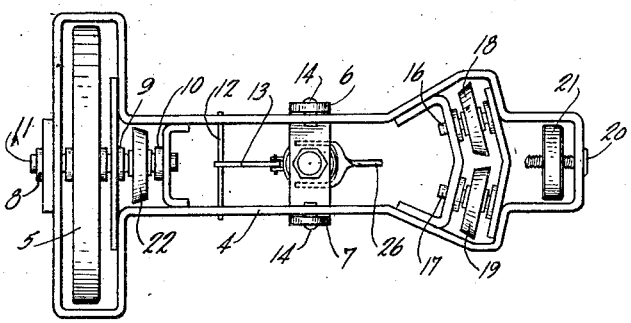
Fig:2
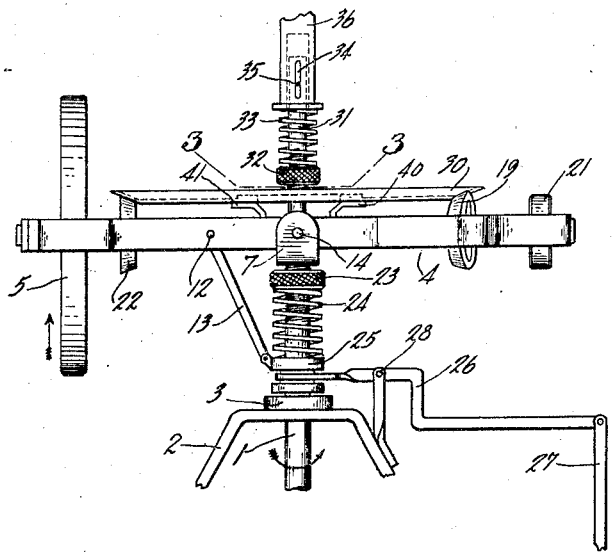
Fig:1
—Inventor—
Rodney G. Richardson
R G Richardson Atty.

Patented Dec. 27, 1927.

1,653,660

UNITED STATES PATENT OFFICE.

RODNEY G. RICHARDSON, OF CHICAGO, ILLINOIS.

SPEED GOVERNOR.

Application filed November 3, 1922. Serial No. 598,773.

My invention relates in general to speed governors, and has for its object the production of a novel and improved device of this kind operating on principles which so far as I am aware have not heretofore been made use of in this connection.

Briefly stated, I employ as a governing force a gyroscopic couple, generated by rotating a heavy body about two perpendicular axes simultaneously at a speed proportionate to the speed of the prime mover to be governed. Suitable mechanism is provided for producing the necessary rotary movements, and in addition means is provided responsive to an increase or decrease in the gyroscopic couple for effecting the necessary control of the prime mover to maintain its speed within desired limits.

The principles of the invention may find expression in numerous mechanical forms, one of which is illustrated in the accompanying drawing, wherein:—

Fig. 1 is a side view of a governor embodying the invention;

Fig. 2 is a top view with the stationary drive wheel and shaft removed; and

Fig. 3 is a top view of the stationary drive wheel with the associated shaft cut away on the line 3—3, Fig. 1.

Referring to the drawings, the shaft 1, of which only the upper end is shown, is rotatably supported in the frame work 2 by means of bearing 3. This shaft supports all the moving parts and is provided with a suitable thrust bearing at its lower end. Also at the lower end of shaft 1 are provided suitable gears or other means by which the shaft is connected to the prime mover. These parts may be of any well known construction, and as they have nothing to do with the invention they have been omitted from the drawing.

Shaft 1 has a fork at its upper end comprising two parallel members 6 and 7, between which is carried the horizontal frame 4, most clearly seen in Fig. 2. The frame 4 is pivoted on the forked end of shaft 1 at 14. On the frame 4 are mounted the fly wheel or gyroscopic shaft 11, supported on bearing 8, 9, and 10, the fixed idler shafts 16 and 17, and the balancing weight 21.

In order to drive the fly wheel 5 the friction drive wheel 30 is provided, Figs. 1 and 3. This wheel is supported a short distance below its center on the lower end of shaft 31 by means of a universal joint comprising T head 38, ring 37, and downwardly extending brackets 40 and 41 attached to the drive wheel. Shaft 31 is slidably supported in a portion 36 of the main framework, and is prevented from turning by means of a pin 35 which projects through slot 34. Surrounding shaft 31 and occupying the space between member 36 and the adjusting nut 32 is a coil spring 33, by means of which the drive wheel 30 is kept pressed down on the friction drive pinion 22 and the idler pinions 18 and 19. As the gyroscope rotates at relatively high speed and has a high inertia, the friction drive is desirable because it permits a slight slipping and eliminates the danger of excessive strain due to sudden changes in the speed of the main shaft. It will be understood that the center of the universal joint is coincident with the intersection of a horizontal line drawn through pivots 14 and a vertical line extending upward through the center of shaft 1, so that the drive wheel is maintained uniformly in engagement with the three pinions regardless of the position of the frame 4.

In operation, the frame 4 assumes varying positions away from the horizontal and in order to communicate these movements to the control apparatus the main shaft 1 has a sliding sleeve 25, which is connected to the frame 4 by link 13 and cross pin 12. Just above the sleeve 25 is a coil spring 24, the tension of which may be adjusted by means of adjusting nut 23. The sleeve 25 is recessed as shown clearly in Fig. 1 to receive a forked lever 26, which is pivoted at 28 on a bracket attached to the frame. Link 27 connects the lever 26 with the control apparatus. For example, when the device is used as a steam engine governor link 27 will connect with the throttle valve.

The operation is as follows: Assuming that the shaft 1 is connected by suitable gearing to the shaft of the prime mover, a steam engine, for instance, so as to be rotated in the direction of the arrow when the engine is running, as the engine is started up the frame 4 will begin to rotate in a horizontal plane about the vertical shaft 1 as an axis. It will be evident, also, that since the drive wheel 30 is held stationary against rotation by pin 35, the fly wheel or gyroscope 5 will now be rotated by pinion 22 in the direction shown by the arrow. As the engine speeds up these simultaneous rotations about perpendicular axes (shaft 1 and shaft 11) will generate a perceptible gyroscopic couple tending to tilt the frame 4 about an axis perpendicular to the two axes of rotation, or about the pivots 14. This gyroscopic couple, or force tending to tilt the frame 4 from the horizontal, will tend to raise the sleeve 25 against the tension of spring 24. The device should be so adjusted that when the desired critical speed is reached the gyroscopic couple will be strong enough to raise the sleeve 25 to a point where the associated control apparatus begins to shut off the steam.

There are two points of adjustment. The weight 21 may be moved in or out to produce an exact balance or any desired degree of unbalance, providing with the latter adjustment a fixed force (gravity) of any desired amount which the gyroscopic couple must overcome before it can begin to act against the spring 24. The spring 24 on the other hand offers a resistance to the gyroscopic couple which increases in proportion to the movement of the sleeve 25, as the spring is compressed, and therefore prevents a sudden or spasmodic operation of the device at the critical speed, which might otherwise entirely shut off the steam.

It will be understood also that a speed responsive device embodying the principles of the invention is not necessarily restricted to use as a speed governor, but may be used in any situation which demands the operation of control or register apparatus in accordance with the speed of an associated machine. By way of example; the device illustrated could be used as a direct reading speed indicator by arranging the link 27 so as to move a pointer over a suitable scale.

Having described my invention, what I consider to be new and desire to have protected by Letters Patent will be pointed out in the appended claims.

What I claim is:

1. In a speed responsive device, a rotatable shaft, a frame pivotally supported on said shaft, a gyroscope rotatably supported in said frame by means of a second shaft, a drive pinion on said second shaft, a drive wheel engaging said pinion, and a universal joint supporting said drive wheel at the intersection of the pivotal axis of said frame and the axis of rotation of said gyroscope.

2. In a speed responsive device, a rotatable shaft, a frame pivotally supported on said shaft, a gyroscope rotatably supported in said frame by means of a second shaft, a drive pinion on said second shaft, a drive wheel engaging said pinion, a third shaft in line with said first shaft, and a universal joint supporting said drive wheel on the end of said third shaft.

3. In a speed responsive device, a rotatable shaft, a frame pivotally supported on said shaft, a gyroscope rotatably supported in said frame by means of a second shaft, a drive pinion supported on said second shaft in fixed relation to said gyroscope, a drive wheel engaging said pinion, and supporting means for said drive wheel preventing the same from rotating while not interfering with movement of said frame on its pivots.

4. In a speed responsive device, a rotatable shaft, a frame pivotally supported on said shaft, a gyroscope rotatably supported in said frame by means of a second shaft, a drive pinion on said second shaft, a drive wheel engaging said pinion, and supporting means for said drive wheel permitting the same to change its plane to accommodate itself to movement of said frame on its pivots while said first shaft is rotating.

5. In a speed responsive device, a pivoted frame, a gyroscope rotatably supported on said frame, means for driving said gyroscope comprising a gear wheel and a pinion, and a universal joint supporting said gear wheel at the intersection of the axis of rotation of said gyroscope with the axis of rotation of said frame.

6. In a speed responsive device, a gyroscope supported on a rigid rotatable shaft, means supporting said shaft for movement about two axes in addition to its axis of rotation, a pinion on said shaft, a gear wheel for driving said pinion, and means supporting said gear wheel to permit the same to continuously change its locus plane responsive to movement of said gyroscope.

7. In a speed responsive device, a gyroscope having three axes of rotation, a rigid shaft constituting one axis, a pinion on said shaft, and a non-rotatable gear wheel driving said pinion responsive to rotation of said gyroscope about one of said axes.

8. In a speed responsive device, a gyroscope having three axes of rotation, a rigid shaft constituting one axis, a pinion on said shaft, a gear wheel driving said pinion, and a universal joint for supporting said gear wheel.

9. In a speed responsive device, two shafts having their axes in alignment, a frame pivotally supported on the end of one shaft, a gear wheel pivotally supported on the end of the other shaft, a gyroscope shaft supported on said frame, and a pinion on said gyroscope shaft in engagement with said gear wheel.

10. In a speed responsive device, a shaft, a frame pivotally supported on the end of said shaft, a gear wheel lying in a plane substantially perpendicular to said shaft, means supporting said gear wheel so that the same can change the angle of its plane with respect to said shaft, a gyroscope shaft supported on said frame, and a pinion on said gyroscope shaft in engagement with said gear wheel.

11. In a speed responsive device, a gyroscope, a pivoted frame supporting said gyroscope, a pair of gears for driving said gyroscope, a universal joint supporting one of said gears, and idler gears on said frame engaging the freely supported gear of said pair to maintain the said pair of gears in engagement.

12. In a speed responsive device a gyroscope having a shaft, means supporting said shaft for movement about another axis in addition to its axis of rotation, a pair of gears for driving said shaft, one gear being fixed to the shaft, a universal joint supporting the other gear, and means for maintaining said gears in engagement.

13. In a speed sensitive device, a gyroscope, means for rotating said gyroscope about two axes set at an angle to each other, a third axis about which said gyroscope moves responsive to a gyroscopic couple, a spring for opposing movement about the said third axis, and an adjustable weight for assisting such movement.

14. In a speed sensitive device, a main shaft, a gyroscope, a shaft for said gyroscope, a frame supporting said gyroscope shaft, means pivotally supporting said frame on said main shaft, and means including a sleeve sliding on said main shaft for communicating movement of said frame on its pivot to a point outside said device.

15. In a speed responsive device, a shaft supported for rotation about three non-coincident axes, a gyroscopic wheel or rotor on said shaft, a pinion on said shaft, a drive wheel fixed against rotation, and means for maintaining said drive wheel and pinion in engagement to cause rotation of said shaft about one axis responsive to rotation about another axis.

Signed at Chicago, county of Cook, and State of Illinois, this 1st day of November, 1922.

RODNEY G. RICHARDSON.